US011136205B2

(12) United States Patent
Gutwein et al.

(10) Patent No.: US 11,136,205 B2
(45) Date of Patent: Oct. 5, 2021

(54) GRAIN BIN POWERSWEEP WITH SWEEP CONVEYOR END WHEEL

(71) Applicant: CTB, Inc., Milford, IN (US)

(72) Inventors: Adam K. Gutwein, Goshen, IN (US); Mark S. Dingeldein, Milford, IN (US); Jeffrey E. Walker, Fort Wayne, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 16/810,699

(22) Filed: Mar. 5, 2020

(65) Prior Publication Data

US 2020/0290826 A1 Sep. 17, 2020

Related U.S. Application Data

(60) Provisional application No. 62/818,287, filed on Mar. 14, 2019.

(51) Int. Cl.
*B65G 65/46* (2006.01)

(52) U.S. Cl.
CPC ................. *B65G 65/466* (2013.01)

(58) Field of Classification Search
CPC ............. B65G 65/466; B65G 65/4836; B65G 65/463; B65G 33/10; B65G 33/18; B65G 33/34; B65G 53/48; A01F 25/20; A01F 25/2018; B60B 15/10; B60B 15/18; B60B 15/22; B60B 25/02
See application file for complete search history.

(56) References Cited

U.S. PATENT DOCUMENTS

| | | | |
|---|---|---|---|
| 3,151,749 A | 10/1964 | Long | |
| 6,254,329 B1 | 7/2001 | Sukup et al. | |
| 6,983,778 B1 * | 1/2006 | Pitts | B60B 15/22 |
| | | | 152/216 |
| 8,210,342 B2 | 7/2012 | Lepp et al. | |
| 10,654,668 B2 * | 5/2020 | Olson | B65G 65/466 |
| 2004/0089385 A1 * | 5/2004 | Kahen | B60B 15/18 |
| | | | 152/185 |
| 2006/0269383 A1 | 11/2006 | Lepp et al. | |
| 2014/0265536 A1 * | 9/2014 | Hein | B60B 15/22 |
| | | | 301/91 |
| 2017/0152110 A1 * | 6/2017 | Rauser | B65G 33/34 |
| 2018/0215559 A1 | 8/2018 | Olson | |
| 2020/0223649 A1 * | 7/2020 | Forsberg | B65G 65/466 |

OTHER PUBLICATIONS

International Search Report and Written Opinion in corresponding International Application No. PCT/US2020/021832 dated Jul. 6, 2020.

* cited by examiner

*Primary Examiner* — Glenn F Myers (74) *Attorney, Agent, or Firm* — Harness, Dickey & Pierce, P.L.C.

(57) ABSTRACT

An auger can be drivingly coupled to an input shaft of a wheel reduction gearbox. The wheel reduction gearbox can drivingly couple the input shaft to an output shaft of the wheel reduction gearbox. The output shaft can be drivingly coupled to a sweep end wheel. The sweep end wheel can include a plurality of tread brackets, a wheel plate, and an adjustable coupling corresponding to each of the tread brackets. Each adjustable coupling can selectively couple one of the tread brackets to the wheel plate in one of a plurality of radial positions. Each of the plurality of radial positions can correspond to the tread bracket being located at a different radial distance from a central axis of rotation of the wheel plate.

21 Claims, 8 Drawing Sheets

GRAIN BIN POWERSWEEP WITH SWEEP CONVEYOR END WHEEL

CROSS-REFERENCE TO RELATED APPLICATIONS

This application claims the benefit of U.S. Provisional Application No. 62/818,287, filed on Mar. 14, 2019. The above application is hereby incorporated herein in its entirety by reference.

FIELD

The present disclosure relates to powersweeps used in removing grains, such as wheat, oats, rye, barley, corn and rice from storage bins; and more particularly to powersweep sweep conveyor end wheels.

BACKGROUND

This section provides background information related to the present disclosure which is not necessarily prior art.

Typically, grain is evacuated from a grain bin in two distinct phases: a gravity unloading phase and a sweeping phase. During the first unloading phase, slide gates are opened within the sumps to clear material via gravity from inside the bin. The bin floor can be a perforated floor through which air passes to aerate the grain in the bin. A below floor unload conveying system is engaged that can move the grain from the sumps to the exterior of the bin. During this initial unloading phase, the above floor sweep conveyor of the powersweep is idle.

Once all material has been evacuated via gravity through the center and any intermediate sumps, the next phase is activated: the sweeping phase. During the sweeping phase, the above floor rotating sweep conveyor is used to pull material from the edges of the bin into the center sump so that the below floor unload conveying system can evacuate the grain to the exterior of the bin. The sweep conveyor typically includes an end wheel system to propel the bin sweep auger in a circular fashion clockwise around the interior of the bin to clean grain remaining after the gravity unload phase through the sumps has been completed. The end wheel can be attached to an intermediate reduction gearbox that is coupled to and derives its forward thrust from the motion of the bin sweep auger.

The sweep conveyor must pass completely around the bin, sweeping the remaining grain as it goes. The requirements to successfully traverse the entirety of the bin floor is second only to the necessity of zero-entry operation; that is mechanical operation of the grain bin sweep without the requirement for human entrance into the grain bin. A major part of achieving true zero-entry operation is the necessity for the grain bin sweep conveyor to pass over any objects protruding up from the floor within the bin that may impede the forward progress of the bin sweep conveyor, including variations in the bin floor height.

Some current powersweep sweep conveyor end wheels can push grain into the sweep conveyor or auger using angled treads mounted directly onto the exterior of the gearbox, or through paddles bolted onto tabs that have been bent at an angle to the gearbox mounting plate. Typical existing designs achieve a mechanism to adjust the angle of the gearbox to effectively raise or lower the sweep auger and backboard by pivoting the gearbox either forward or backward. Some examples of powersweeps including sweep conveyor end wheels are U.S. Pat. No. 8,210,342 issued to Lepp et al. on Jul. 3, 2012, and U.S. Pat. No. 6,254,329 issued to Sukup et al. on Jul. 3, 2001. The above referenced patents (and any other U.S. patents or patent publications identified herein) are incorporated herein by reference in their entirety.

SUMMARY

This section provides a general summary of the disclosure, and is not a comprehensive disclosure of its full scope or all of its features.

In one aspect of the present disclosure, a grain bin powersweep can include an auger drivingly coupled to an input shaft of a wheel reduction gearbox. The wheel reduction gearbox can drivingly couple the input shaft to an output shaft of the wheel reduction gearbox. The output shaft can be drivingly coupled to a sweep end wheel. The sweep end wheel can include a plurality of tread brackets, a wheel plate, and an adjustable coupling corresponding to each of the tread brackets. Each adjustable coupling can selectively couple one of the tread brackets to the wheel plate in one of a plurality of radial positions. Each of the plurality of radial positions can correspond to the tread bracket being located at a different radial distance from a central axis of rotation of the wheel plate.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

With reference to FIGS. 1-11, an example embodiment of a grain bin powersweep 76 with a sweep end wheel 20 for the above floor sweep conveyor 22 in accordance with the present disclosure is illustrated and described. As discussed above, a powersweep 76 includes an unload conveyor 72 below the floor 52 of the grain bin 70 that can move the grain from the sumps, including a center sump 74, to the exterior of the bin 70 and the rotating sweep conveyor 22 above the floor 52 of the grain bin 70 that can be engaged during a sweeping phase to move grain from the edges of the bin 70 into the center sump 74 so that the below floor unload conveyor 72 can evacuate the grain to the exterior of the bin 70.

In the illustrated example, an end wheel 20 of the sweep conveyor 78 includes a wheel plate 24, and a number of adjustable tread brackets 26. The wheel plate 24 can be pinned to the output shaft 28 of a wheel reduction gearbox 30, which causes the wheel plate 24 to rotate as the output gearbox shaft 28 rotates. The input shaft 32 of the wheel reduction gearbox 30 can be coupled to the auger shaft 34 of the sweep conveyor 22 to transfer power through from the auger 36 to the end wheel 20.

The adjustable tread brackets 26 can include a base portion or component 38 and a tread portion or component 40 coupled thereto. The adjustable tread brackets 26 can be bolted in one of several positions onto the wheel plate 24. For example, slotted apertures 46 can be provided on the tread brackets 26, the wheel plate 24, or both, through which a bolt 44 extends to adjustably mount the tread brackets 26 to the wheel plate 24 in a desired one of the several positions. In some embodiments, the positioning of the tread brackets 26 can be adjusted without the need to completely remove the bolts 44. For example, the bolts 44 can only need to be loosened to allow the tread bracket 26 to be slid to a new position in a slotted aperture 46 before the bolts are retightened.

In some embodiments, the shape of the slotted apertures 46 can include multiple distinct positioning recesses 48 that can capture the bolt 44 to help hold it, and the tread bracket 26 in a corresponding position. For example, the slotted apertures 46 can have an overall generally "V" shape providing three distinct positioning recesses 48 at the end of each arm and at the base of the "V" that correspond to three different outer wheel diameters or radii related to the tread bracket 26. In other examples, the slotted apertures 46 can have an overall generally "Z" shape or continuous or interconnected "V" shape that can provide greater numbers of distinct positioning recesses 48. Of course, many other shapes are possible.

In other examples, each distinct positioning recess 48 can be a set of distinct recesses 48, in which each distinct positioning recess 48 of the set is an independent aperture or opening separate from the aperture or opening of the other distinct positioning recesses 48. For example, a set of separate distinct positioning recesses 48 can number three and can be positioned in a triangular or "V" shape arrangement. In addition, all or some of a set of separate distinct positioning recesses 48 can be oriented in a vertical or straight line. Each of the tread brackets 26 can include two or more sets of distinct positioning recesses 48. A bolt 44 can be positioned through one of the distinct positioning recesses 48 of each set of a tread bracket 26 to couple the tread bracket 26 to the wheel plate 24.

Figure 1:
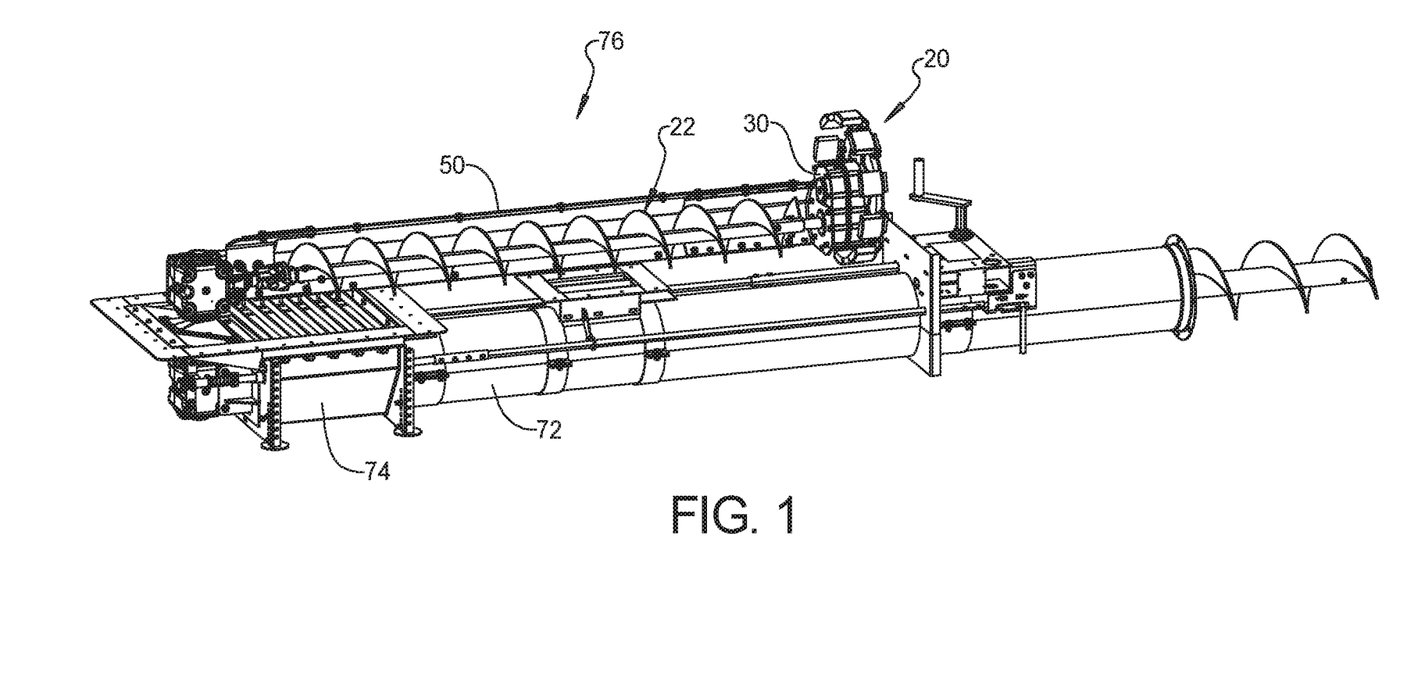
FIG. 1 is a perspective view of an example grain bin powersweep with a sweep end wheel in accordance with the present disclosure.
Figure 2:
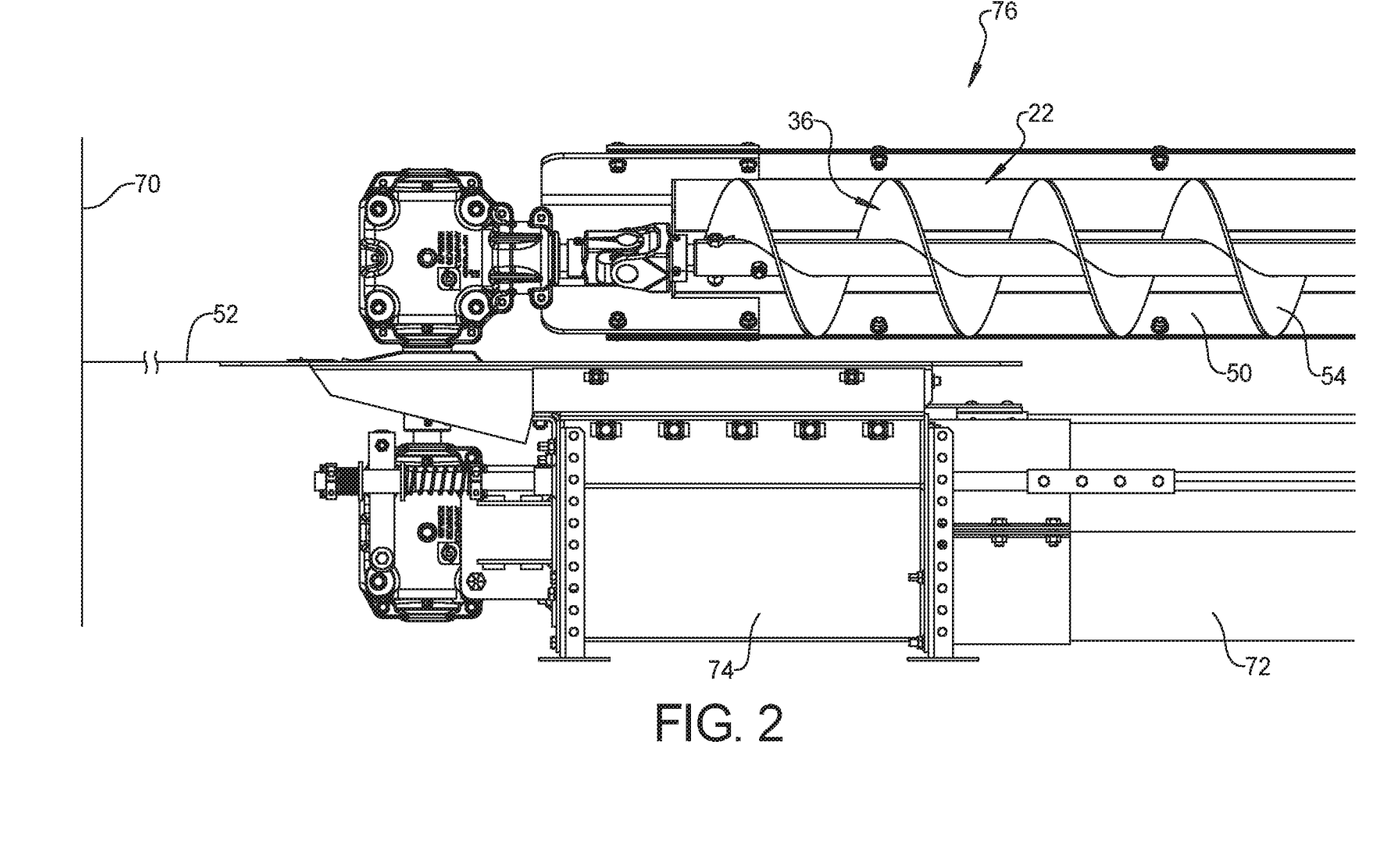
FIG. 2 is a fragmentary side elevation view of the grain bin powersweep of FIG. 1.
Figure 3:
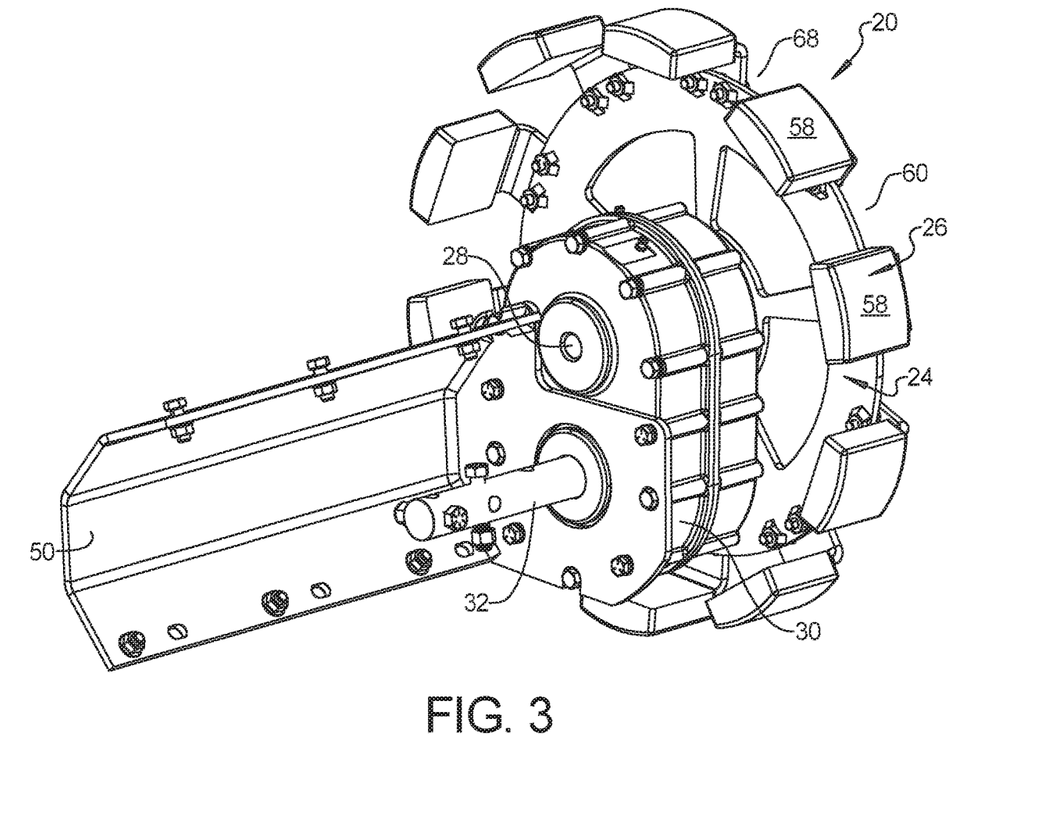
FIG. 3 is a perspective view of the example sweep end wheel of FIG. 1 and related components.
Figure 4:
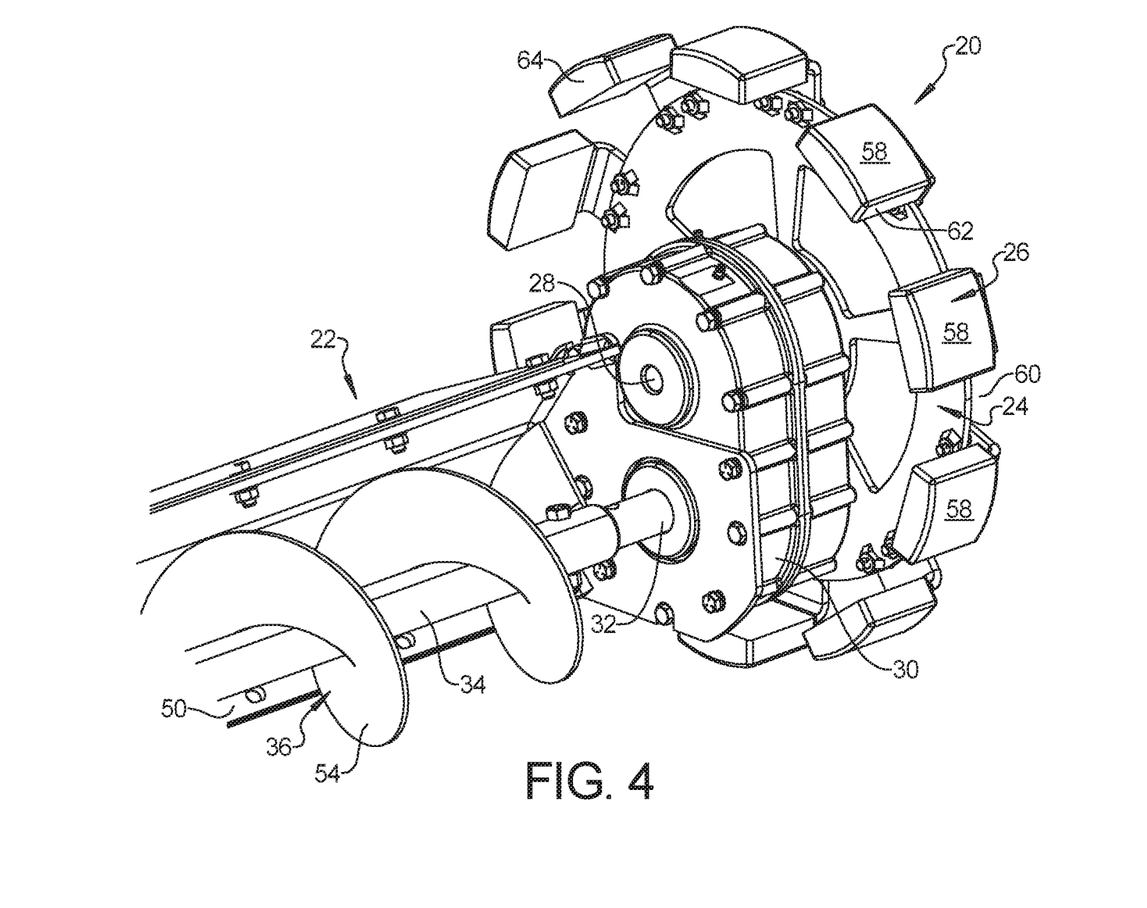
FIG. 4 is a perspective view similar to FIG. 3 with additional related components.
Figure 5:
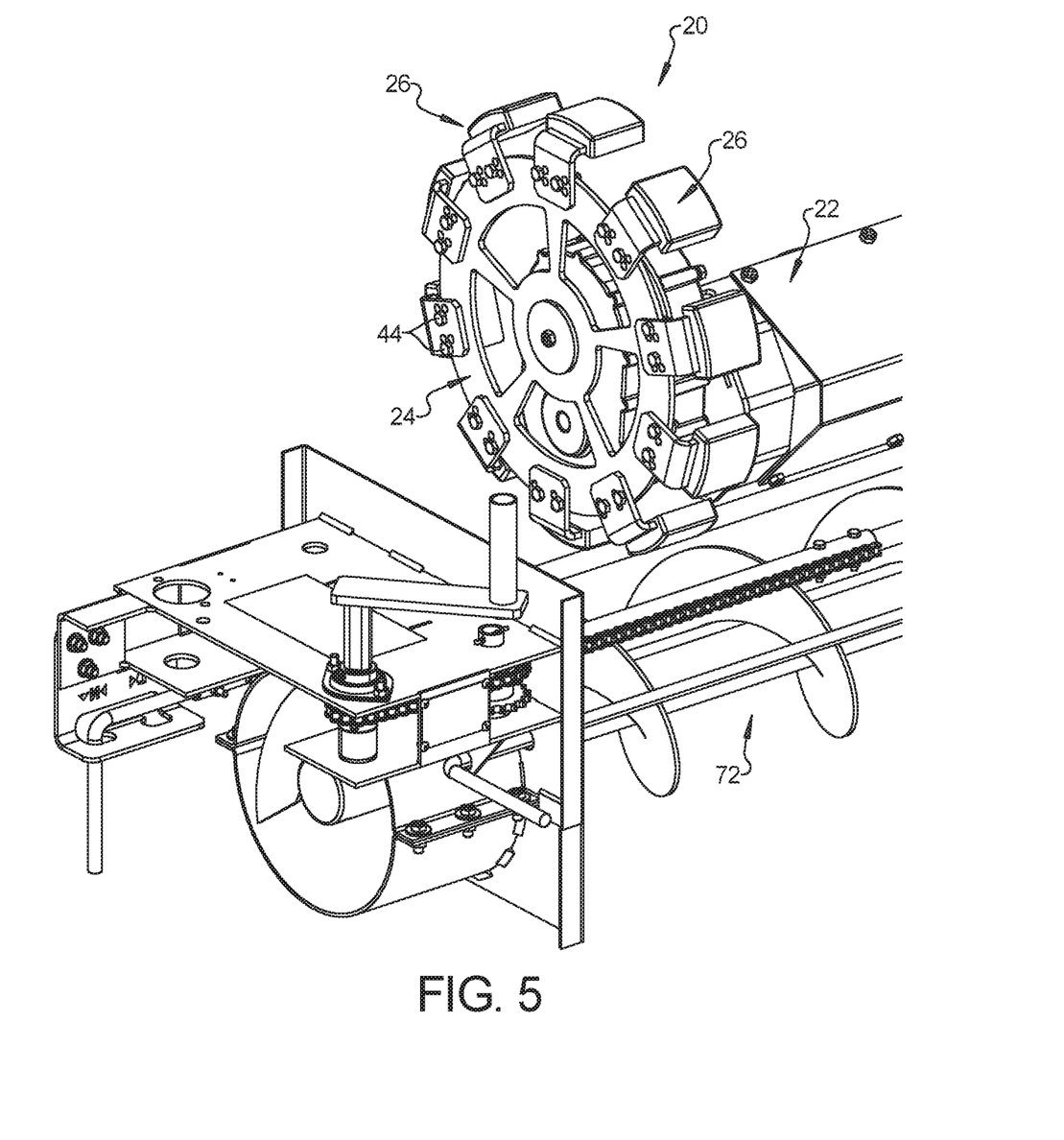
FIG. 5 is a fragmentary perspective view of the example grain bin powersweep with a sweep end wheel of FIG. 1.
Figure 6:
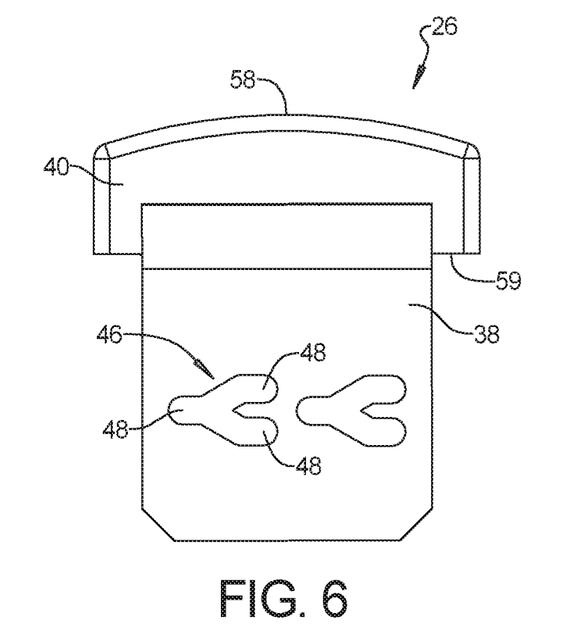
FIG. 6 is an elevation view of an example adjustable tread bracket for the example grain bin powersweep with a sweep end wheel of FIG. 1.
Figure 7:
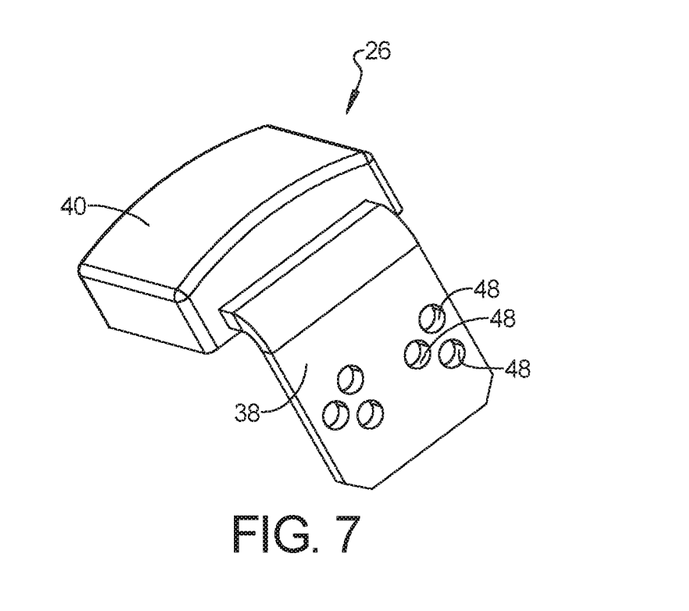
FIG. 7 is a perspective view an example adjustable tread bracket for the example grain bin powersweep with a sweep end wheel of FIG. 1.
Figure 8:
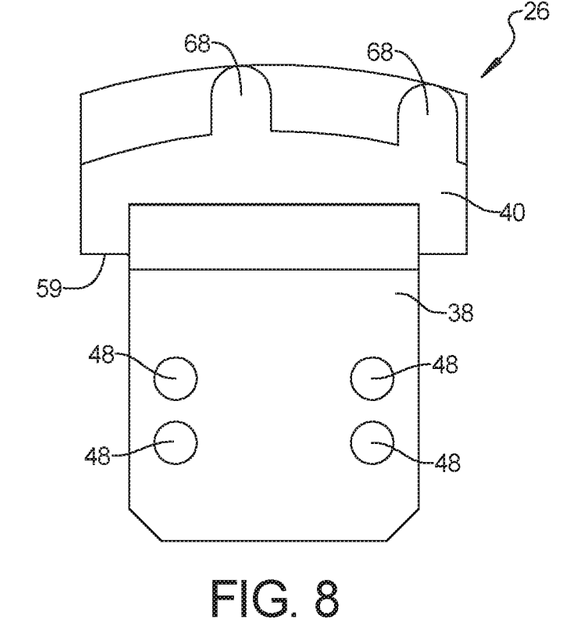
FIG. 8 is an elevation view of an example adjustable tread bracket for the example grain bin powersweep with a sweep end wheel of FIG. 1.
Figure 9:
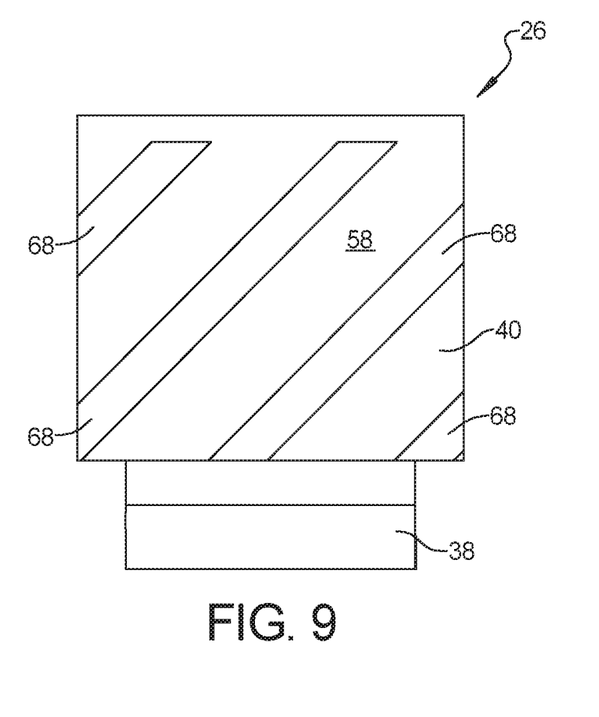
FIG. 9 is a top plan view of the example adjustable tread bracket of FIG. 8.
Figure 10:
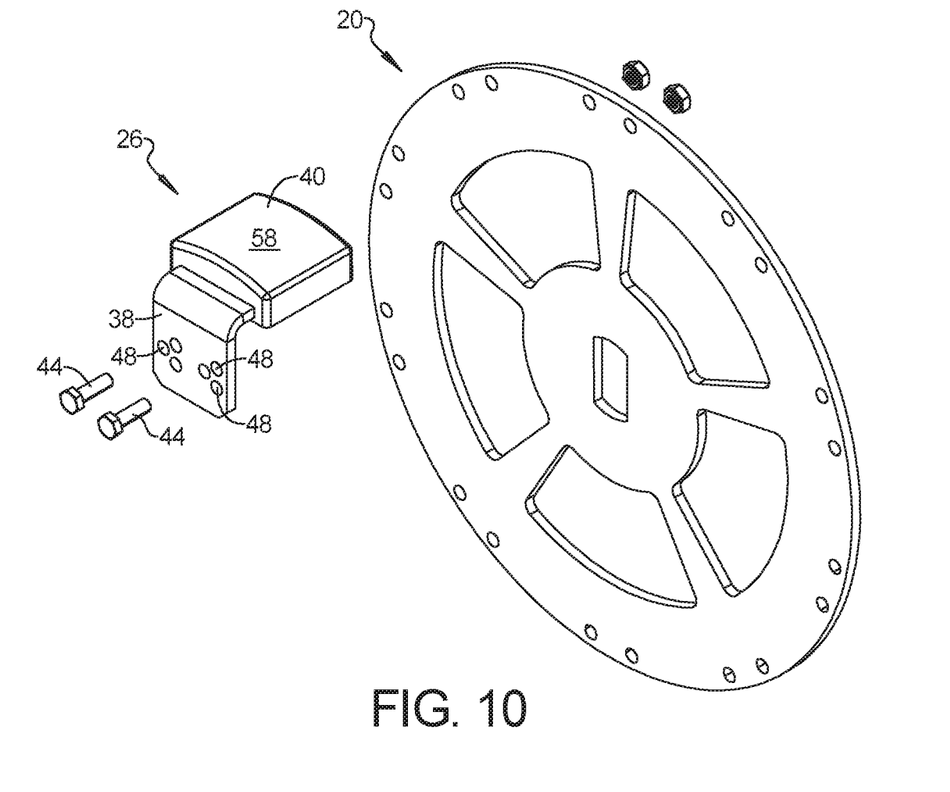
FIG. 10 is an exploded view of components of the sweep end wheel of the example grain bin powersweep with a sweep end wheel of FIG. 1.
Figure 11:
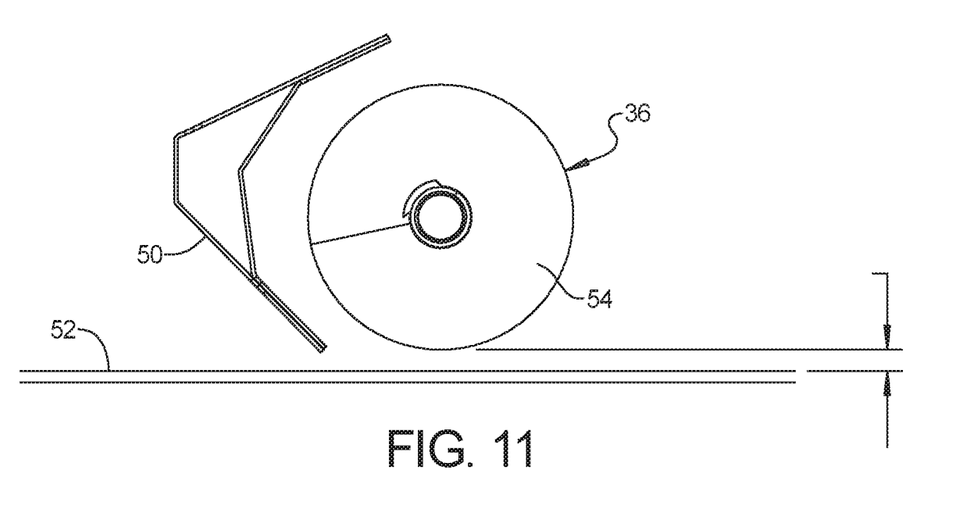
FIG. 11 is an illustration showing positional relationships between the sweep auger and backboard of FIG. 1 and the grain bin floor.

Thus, the adjustable tread brackets 26 can be moved radially inward or outward on the wheel plate 24 to expand or contract the overall diameter of the wheel 20, which can function to increase or decrease the height of the bin sweep auger 36 and backboard 50 in relation to the grain bin floor 52. As a result, the minimum height of the auger 36 and backboard 50 above the grain bin floor 52 can be selected so that any protruding objects or height variations in the grain bin floor 52 can be passed over, while simultaneously keeping the backboard 50 as close to the bin floor 52 as possible to minimize required cleanout after sweep operation.

The height adjustability provided by the adjustable diameter of the sweep conveyor wheel 20 can also enable the auger 36 and the backboard 50 to be set at the same minimum vertical height or distance above the grain bin floor 52. This height adjustability can also enable the auger 36 to be set at a minimum vertical height or distance above the grain bin floor 52 that is less than the corresponding minimum vertical height or distance above the grain bin floor 52 of the backboard 50. In other words, the lowest part of the auger flighting 54 can be set at or below the lowest part of the backboard 50, among other options.

In addition, the height adjustability can be provided without requiring the vertical relationship between the output shaft 28, wheel shaft or center axis around which the end wheel 20 rotates, and the auger shaft 34 or center axis around which the auger 36 rotates to be altered. In contrast, existing designs typically enable the sweep auger 36 and backboard 50 to be raised or lowered in relation to the floor 52 by radially pivoting the gearbox 30 around the auger shaft 34. This radial pivoting movement changes the vertical relationship between the wheel shaft, e.g., output shaft 28, and auger shaft 34 into one where their centers or axis are vertically offset. Such vertically off-center relationship can create an unbalanced weight distribution on the end wheel 20.

In contrast, the height adjustability provided herein can maintain the original orientation of the wheel gearbox. In this orientation of the gearbox 30, the input shaft 32 can be coupled to and vertically centered on or aligned with the central axis of rotation auger shaft 34, and the central axis of rotation of the output shaft 28 (and the central axis of rotation of the end wheel 20) can be vertically centered on or aligned with the gearbox input shaft 32 and the auger shaft 34. Thus, the height adjustability can be provided while maintaining the weight distribution perfectly centered, which adds to the stability and design consistency of the grain bin sweep 22.

One potential benefit of such wheel diameter and height adjustability is it can be used to take into account the rotational velocity of a wheel 20 in relation to the diameter and effective circumference of the wheel 20. As the diameter and effective circumference increases, the rotational velocity increases. This allows for increasing the wheel velocity by increasing the diameter or effective circumference of the wheel 20. Similarly, this allows for the decreasing of the wheel velocity by decreasing the wheel diameter or effective circumference of the wheel 20. Thus, the speed at which the sweep conveyor 22 rotates around the grain bin 56 can be increased or decreased as desired.

The contact surfaces 58 of the wheel 20 are provided by a series of separate tread brackets 26 that can be spaced from each other circumferentially. These open spaces or gaps 60 between the tread brackets 26 and contact surfaces 58 around the circumference of the wheel 20 can provide several benefits. For example, these spaces or gaps 60 in the contact surface 58 around the circumference of the wheel 20 can help ensure that the sweep wheel 20 resists climbing on top of the grain pile as it advances forward. Instead, the grain can pass between the interrupted contact surfaces 58 or thru the spaces 60 between the tread brackets 26, resulting in the wheel 20 falling down through the grain as the grain moves between the brackets 26.

In addition, since the contact surface 58 or outer circumference of the wheel 20 is not continuous and has gaps or spaces 60 between different tread components 40 of the tread brackets 26, the wheel 20 can chip into any packed grain, rather than riding along the top. The spaces or gaps 60 created by the tread brackets 26 provide edges that can impact and chip into packed grain to break up any clumps as the wheel 20 rotates. With a wheel 20 having a continuous or uninterrupted circumference, there are not such surfaces to dig into the packed grain.

The tread brackets 26 can help ensure that the grain is moved in the direction of the sweep auger 36 as the sweep conveyor 22 advances. For example, the open wheel design can gather and move a larger amount of grain away from the circumferential outer bin wall 72 toward the auger 36 than traditional wheels 20 due to the interrupted circumference or gaps 60 of the wheel 20. In addition, any grain caught underneath the wheel 20 can be moved away, which allows the wheel 20 to dig itself down to make virtually constant contact with the bin floor 52. The inward movement (away from the outer bin wall toward the auger 36 or center of the bin 70) of grain can be facilitated in several ways. For example, the leading side edges 62 of the treads 40 of the tread brackets 26 can be angled inwardly, so that grain contacting the leading edge 62 as the wheel 20 rotates forward is pushed inwardly. Similarly, the tread face or contacting surface 58 of the wheel 20 can be inclined inwardly so that the inner edge 64 of the tread face 58 is lower than the outer edge 66, so that grain contacting the tread face 58 as the wheel 20 rotates forward is pushed inwardly. In addition, the tread face 58 can include one or more raised ribs or tread portions 68 that are angled inwardly, so that grain contacting the raised tread portions or ribs 68 as the wheel 20 rotates forward is pushed inwardly.

The contact face surface 58 of each tread portion 40 of the tread brackets 26 can have an outwardly convex shape. An inner face surface 59 of each tread portion 40 that is opposite the contact face surface 58 can have a planar shape. The contact face surface 58 of each tread portion 40 of the tread brackets 26 can have a length in a circumferential direction that is larger than a width of the contact face surface 58.

In some cases, it can be desirable that not all of the treads 40 or contact surfaces 58 of the tread brackets 26 be set at the same height, so that the diameter or radius of the wheel 20 is different at different tread brackets 26. For example, the tread brackets 26 may be set in a scaling or progressive pattern so that the diameter of the wheel 20 or the radii from the axis of the output shaft 28 of the gearbox 30 (or from the axis of the wheel 20) provides for constant variation in the height of the auger flighting 54 and backboard 50 in relation to the bin floor 52. In some cases, this can create a sinusoidal vertical motion of the sweep auger 36 as it moves around the grain bin 70. As another example, the tread brackets 26 can be set in a pattern that successively alternates between two different heights, diameters, or radii. Such an alternating pattern can, for example, increase the ability of the wheel 20 to chip into and break up packed grain clumps, or increase the ability of the wheel 20 to move grain away from the outer wall 72 of the bin 70 and toward the center of the grain bin 70 as the sweep conveyor 22 advances as the wheel 20 rotates.

Because the wheel 20 is formed of a series of individual tread brackets 26, if individual tread brackets 26 become damaged or worn, the whole wheel 20 does not need to be replaced. In some cases, the tread portion or component 40 of the tread bracket 26 can be molded to the bracket portion or component 38, or otherwise permanently joined together. In some cases, the bracket or base portion 38 and tread portion 40 can be separate components that are removably coupled together, so that worn or damaged tread components 40 can be readily replaced without replacing the bracket or base component 38. In some cases, the tread portion 40 of one or more of the tread brackets 26 of a single wheel 70 can be formed of a first material, and the tread portion 40 of one or more different tread brackets 26 of the same wheel 70 can be formed of a second material that is different from the first material. As an example, the first material can be harder or more resistant to wear than the second material of the tread portions 40. Potential tread portion materials could include metals, plastics, rubbers, and similar materials.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grain bin powersweep with a sweep end wheel comprising:
    an above-floor bin sweep conveyor including an auger drivingly coupled to an input shaft of a wheel reduction gearbox, the wheel reduction gearbox drivingly coupling the input shaft to an output shaft of the wheel reduction gearbox, and the output shaft being drivingly coupled to the sweep end wheel; and
    the sweep end wheel including a plurality of tread brackets, a wheel plate, and an adjustable coupling corresponding to each of the tread brackets, each adjustable coupling selectively coupling one of the tread brackets to the wheel plate in one of a plurality of fixed radial positions, with each of the plurality of fixed radial positions corresponding to the tread bracket being located at a different fixed radial distance from a central axis of rotation of the wheel plate,
    wherein the adjustable couplings support and transfer a weight of the above-floor bin conveyor from the wheel plate to the tread bracket in each of the plurality of fixed radial positions.

2. The grain bin powersweep with the sweep end wheel of claim 1, wherein each adjustable coupling includes at least one slotted aperture through a first of the wheel plate and the tread bracket, and a bolt extending through each slotted aperture and through a second of the wheel plate and the tread bracket.

3. The grain bin powersweep with the sweep end wheel of claim 2, wherein the first of the wheel plate and the tread bracket is the tread bracket and the second of the wheel plate and the tread bracket is the wheel plate.

4. The grain bin powersweep with the sweep end wheel of claim 2, wherein the at least one slotted aperture comprises a pair of slotted apertures.

5. The grain bin powersweep with the sweep end wheel of claim 2, wherein each slotted aperture has a shape that includes a plurality of distinct positioning recesses for the bolt.

6. The grain bin powersweep with the sweep end wheel of claim 5, wherein the shape of each slotted aperture includes at least one V-shape providing three of the distinct positioning recesses, with each of the three distinct positioning recesses being at an end of each arm of the V-shape and at the base of the V-shape, respectively.

7. The grain bin powersweep with the sweep end wheel of claim 2, wherein each slotted aperture has a shape that includes at least three distinct positioning recesses for the bolt.

8. A grain bin powersweep with a sweep end wheel comprising:
 an above-floor bin sweep conveyor including an auger drivingly coupled to an input shaft of a wheel reduction gearbox, the wheel reduction gearbox drivingly coupling the input shaft to an output shaft of the wheel reduction gearbox, and the output shaft being drivingly coupled to the sweep end wheel; and
 the sweep end wheel including a plurality of tread brackets, a wheel plate, and an adjustable coupling corresponding to each of the tread brackets, each adjustable coupling selectively coupling one of the tread brackets to the wheel plate in one of a plurality of radial positions, with each of the plurality of radial positions corresponding to the tread bracket being located at a different radial distance from a central axis of rotation of the wheel plate;
 wherein each adjustable coupling includes at least one set of distinct positioning recesses through a first of the wheel plate and the tread bracket, and a bolt extending through each set of distinct positioning recesses and through a second of the wheel plate and the tread bracket, and wherein an independent aperture that defines each distinct positioning recess is separate from independent apertures defining other distinct positioning recesses of the set.

9. The grain bin powersweep with the sweep end wheel of claim 8, wherein the first of the wheel plate and the tread bracket is the tread bracket and the second of the wheel plate and the tread bracket is the wheel plate.

10. The grain bin powersweep with the sweep end wheel of claim 8, wherein the at least one set of distinct positioning recesses is two sets of distinct positioning recesses.

11. The grain bin powersweep with the sweep end wheel of claim 8, wherein the independent apertures defining the distinct positioning recesses of a set are positioned in a triangular arrangement.

12. The grain bin powersweep with the sweep end wheel of claim 8, wherein the independent apertures defining the distinct positioning recesses of a set are positioned in a straight line.

13. A grain bin powersweep with a sweep end wheel comprising:
 an above-floor bin sweep conveyor including an auger drivingly coupled to an input shaft of a wheel reduction gearbox, the wheel reduction gearbox drivingly coupling the input shaft to an output shaft of the wheel reduction gearbox, and the output shaft being drivingly coupled to the sweep end wheel; and
 the sweep end wheel including a plurality of tread brackets, a wheel plate, and an adjustable coupling corresponding to each of the tread brackets, each adjustable coupling selectively coupling one of the tread brackets to the wheel plate in one of a plurality of radial positions, with each of the plurality of radial positions corresponding to the tread bracket being located at a different radial distance from a central axis of rotation of the wheel plate;
 wherein the above-floor bin sweep conveyor includes a backboard extending alongside the auger and coupled to the auger to move vertically up and down with the auger, and a lowermost edge of the backboard is at a vertical height that is at or above a vertical height of a lowermost edge of the auger.

14. The grain bin powersweep with the sweep end wheel of claim 13, wherein the central axis of rotation of the wheel plate is vertically aligned with an axis of rotation of the auger, regardless of which of the plurality of radial positions is selectively used to couple each of the tread brackets to the wheel plate.

15. A grain bin powersweep with a sweep end wheel comprising:
 an above-floor bin sweep conveyor including an auger drivingly coupled to an input shaft of a wheel reduction gearbox, the wheel reduction gearbox drivingly coupling the input shaft to an output shaft of the wheel reduction gearbox, and the output shaft being drivingly coupled to the sweep end wheel; and
 the sweep end wheel including a plurality of tread brackets, a wheel plate, and an adjustable coupling corresponding to each of the tread brackets, each adjustable coupling selectively coupling one of the tread brackets to the wheel plate in one of a plurality of radial positions, with each of the plurality of radial positions corresponding to the tread bracket being located at a different radial distance from a central axis of rotation of the wheel plate;
 wherein the central axis of rotation of the wheel plate is vertically aligned with an axis of rotation of the auger, regardless of which of the plurality of radial positions is selectively used to couple each of the tread brackets to the wheel plate.

16. The grain bin powersweep with the sweep end wheel of claim 1, wherein the tread bracket comprises a tread component coupled to a bracket component by being molded to the bracket component.

17. The grain bin powersweep with the sweep end wheel of claim 16, wherein each tread bracket has a tread portion that includes a contact face surface having a convex shape.

18. The grain bin powersweep with the sweep end wheel of claim 17, wherein each tread portion includes an inner face surface opposite the contact face surface having a planar shape.

19. The grain bin powersweep with the sweep end wheel of claim 1, wherein each tread bracket includes a tread portion with a contact face surface having a length in a circumferential wheel dimension that is larger than a width of the contact face surface.

20. The grain bin powersweep with the sweep end wheel of claim 1, wherein the tread brackets are selectively coupled to the wheel plate leaving a gap between adjacent tread brackets in a circumferential direction.

21. The grain bin powersweep with the sweep end wheel of claim 1, wherein the tread brackets comprise a tread component coupled to a bracket component, and a first of the plurality of tread brackets is formed of a first material, and a second of the plurality of tread brackets is formed of a second material that is different from the first material.

* * * * *